United States Patent [19]

Back et al.

[11] Patent Number: 4,681,596

[45] Date of Patent: Jul. 21, 1987

[54] PROCESS FOR DYEING NATURAL OR SYNTHETIC POLYAMIDE FIBRE MATERIALS WITH 1:1 METAL COMPLEX DYES OR MIXTURES OF DYES WITH FLUORIDE, FLUOROSILICATE OR FLUOROBORATE

[75] Inventors: Gerhard Back, Lörrach, Fed. Rep. of Germany; Walter Mosimann, Therwil, Switzerland

[73] Assignee: Ciba-Geigy Corporation, Ardsley, N.Y.

[21] Appl. No.: 861,378

[22] Filed: May 9, 1986

Related U.S. Application Data

[63] Continuation-in-part of Ser. No. 737,112, May 23, 1985, Pat. No. 4,623,358.

[30] Foreign Application Priority Data

May 30, 1984 [CH] Switzerland ......................... 2667/84
May 24, 1985 [CH] Switzerland ......................... 2219/85

[51] Int. Cl.$^4$ ..................... C09B 45/02; C09B 67/24; D06P 1/67; D06P 3/06
[52] U.S. Cl. ............................................. 8/620; 8/626; 8/630; 8/634; 8/638; 8/680; 8/685; 8/917; 8/924
[58] Field of Search ................... 8/634, 680, 685, 620, 8/626

[56] References Cited

U.S. PATENT DOCUMENTS

| | | | |
|---|---|---|---|
| 3,592,584 | 7/1971 | Link et al. | 8/589 |
| 3,630,662 | 12/1971 | Brody et al. | 8/613 |
| 3,857,727 | 12/1974 | Benisek | 8/490 |
| 3,990,842 | 11/1976 | Millsaps | 8/632 |
| 4,444,564 | 4/1984 | Salathe et al. | 8/588 |
| 4,623,358 | 11/1986 | Back et al. | 8/620 |

FOREIGN PATENT DOCUMENTS 1090946 11/1967 United Kingdom .
1275459 5/1972 United Kingdom .

*Primary Examiner*—A. Lionel Clingman
*Attorney, Agent, or Firm*—Edward M. Roberts; Meredith C. Findlay

[57] ABSTRACT

The invention relates to a process for dyeing natural or synthetic polyamide fibre material levelly from an aqueous liquor, with 1:1 metal complex dyes and at least one metal free dye, all of which contain sulfo groups, in the presence of an alkali metal salt or an ammonium salt and optionally in the presence of an assistant, which comprises carrying out dyeing in the presence of an alkali metal fluoride or ammonium fluoride, or an alkali metal fluorosilicate or ammonium fluorosilicate, or of an alkali metal fluoroborate or ammonium fluoroborate, at a pH in the range from 3 to 7.

The process of this invention is suitable for dyeing natural or synthetic polyamide material in level shades of good fastness properties.

25 Claims, No Drawings

PROCESS FOR DYEING NATURAL OR SYNTHETIC POLYAMIDE FIBRE MATERIALS WITH 1:1 METAL COMPLEX DYES OR MIXTURES OF DYES WITH FLUORIDE, FLUOROSILICATE OR FLUOROBORATE

CROSS-REFERENCE

This is a continuation-in-part of our application Ser. No. 737,112, filed May 23, 1985, now U.S. Pat. No. 4,623,358, issued Nov. 18, 1986.

The present invention relates to a process for dyeing natural and synthetic polyamide fibre materials levelly with 1:1 metal complex dyes from an aqueous liquor in the presence of an alkali metal fluoride or ammonium fluoride, an alkali metal fluorosilicate or ammonium fluorosilicate or an alkali metal fluoroborate or ammonium fluoroborate, and optionally in the presence of an assistant, in which process dyeing is carried out at a mild pH value in the range from 3 to 7, the dyebath is almost completely exhausted and the dyeing has good allround fastness properties, in particular good wetfastness and good lightfastness properties, and to the material dyed by said process and to a composition for carrying out the dyeing.

The disadvantage of the conventional methods of dyeing natural or synthetic polyamide fibre materials with 1:1 metal complex dyes is that these dyes must be applied in the pH range from about 1.9 to 2.8 in order to obtain level dyeings. In addition to the duration of dyeing, the pH of the dyebath is of decisive importance for dyeing natural and synthetic polyamide fibre materials, especially for dyeing wool, as these fibre materials, again in particular wool, are severely attacked both in the strongly acidic and in the strongly alkaline pH range.

Surprisingly, there has now been found a novel process that does not have the shortcoming referred to above and which makes it possible to dye natural or synthetic polyamide materials, in simple manner, in the mild pH range from 3 to 7, preferably from 4 to 6.

Accordingly, the present invention provides a process for dyeing natural or synthetic polyamide fibre material levelly from an aqueous liquor with 1:1 metal complex dyes which contain sulfo groups, in the presence of an alkali metal salt or an ammonium salt and optionally in the presence of assistants, which comprises carrying out dyeing in the presence of an alkali metal fluoride or ammonium fluoride, of an alkali metal fluorosilicate or ammonium fluorosilicate, or of an alkali metal fluoroborate or ammonium fluoroborate, at a pH in the range from 3 to 7.

The eligible 1:1 metal complex dyes are preferably monoazo dyes or disazo dyes which contain a chromium ion as metal ion.

Depending on the desired depth of shade, the amounts in which the 1:1 metal complex dyes are used in the dyebaths may vary within wide limits. In general, amounts from 0.01 to 10 percent by weight, based on the goods to be dyed, of one or more dyes are advantageous.

It has long been known to dye natural or synthetic polyamide fibre materials with 1:1 metal complex dyes in the presence of an alkali metal sulfate or alkali metal chloride, for example sodium sulfate and sodium chloride, and optionally of an assistant. Surprisingly, the use of an alkali metal fluoride, ammonium fluoride, of an alkali metal fluorosilicate or ammonium fluorosilicate, or of an alkali metal fluoroborate or ammonium fluoroborate, optionally in the presence of an assistant, makes it possible to dye these fibre materials in a mild pH range.

In the process of this invention, it is preferred to use sodium or potassium fluoride as alkali metal fluoride.

The alkali metal fluorosilicate or ammonium fluorosilicate employed in the process of this invention is the alkali metal salt or ammonium salt of hexafluorosilicic acid. It is preferred to use $Na_2SiF_6$, $K_2SiF_6$ or $(NH_4)_2SiF_6$.

The alkali metal fluoroborate or ammonium fluoroborate employed in the process of the invention is the alkali metal salt or ammonium salt of fluoroboric acid. It is preferred to use $NaBF_4$, $KBF_4$ or $NH_4BF_4$.

Preferred embodiments of the process of the present invention comprise:

(a) dyeing in the presence of an alkali metal fluoride or ammonium fluoride, (b) dyeing in the presence of an alkali metal fluoride, preferably sodium or potassium fluoride, (c) dyeing in the presence of ammonium fluoride, (d) dyeing in the presence of an alkali metal fluorosilicate or ammonium fluorosilicate, (e) dyeing in the presence of an alkali metal fluorosilicate, preferably sodium or potassium fluorosilicate, (f) dyeing in the presence of ammonium fluorosilicate, (g) dyeing in the presence of an alkali metal fluoroborate or an ammonium fluoroborate, and (h) dyeing in the presence of an alkali metal fluoride or ammonium fluoride and of an assistant or mixture of assistants.

The amount in which the alkali metal fluoride or ammonium fluoride, alkali metal fluorosilicate or ammonium fluorosilicate or alkali metal fluoroborate or ammonium fluoroborate is employed in the dyebaths may vary within wide limits. In general, half to four times the amount by weight, preferably one to three times the amount by weight and, most preferably, two to three times the amount by weight, of alkali metal fluoride or ammonium fluoride, alkali metal fluorosilicate or ammonium fluorosilicate, or of alkali metal fluoroborate or ammonium fluoroborate, based on the amount by weight of dye, has proved advantageous.

The assistants suitable for use in the process of this invention are known per se and are prepared by known methods. Preferably, they are levelling assistants or mixtures of different levelling assistants. Suitable levelling assistants are anionic, cationic, nonionic and amphoteric compounds or mixtures thereof.

Examples of suitable anionic compounds are: substituted naphthalenesulfonic acids, sulfonic acid hemiesters of ethoxylates, salts of alkanesulfonic acids of longer chain length, salts of alkylarlysulfonic acids, in particular dodecylbenzenesulfonic acids, fatty acid amide sulfonic acids, and sulfuric acid hemiesters of fatty amine polyglycol ethers. Representative examples of cationic compounds are: polyglycol ethers of fatty amines, polyglycol ethers of fatty acid amide-amines, and quaternary ammonium compounds. Typical examples of nonionic compounds are: polyglycol ethers of fatty alcohols, of alkylphenols, of resinic acids, and of fatty acid alkylolamides. Typical examples of amphoteric compounds are: reaction products of ethoxylated fatty amines and hydroxyethanesulfonic acids, reaction products of phenol and styrene, and polyethylene glycol di-fatty acid esters.

It is preferred to use levelling assistant compositions containing compounds of the formula

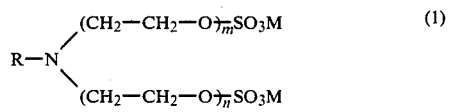 (1)

wherein R is an alkyl or alkenyl radical of 12 to 22 carbon atoms, M is hydrogen, an alkali metal or ammonium cation, and m and n are integers, the sum of m+n being from 2 to 14; or compounds of the formula

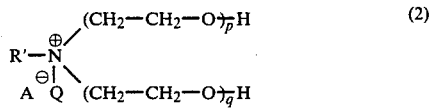 (2)

wherein R' independently of R has the meaning of R, A is an anion, Q is an unsubstituted or substituted alkyl radical and p and q are integers, the sum of p+q being from 2 to 50; or compounds of the formula

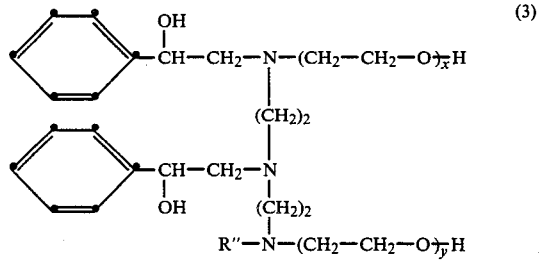 (3)

wherein R" independently of R has the meaning of R and x and y are integers, the sum of x+y being from 80 to 140; or a mixture containing compounds of formulae (1) and (2) or a mixture containing compounds of the formulae (1), (2) and (3).

It is particularly preferred to use a mixture of levelling assistants comprising 5 to 70 parts by weight of a compound of the formula (1), 15 to 60 parts by weight of compound of formula (2), and 5 to 60 parts by weight of the compound of formula (3), based on 100 parts by weight of said mixture, wherein R, R' and R" in formulae (1), (2) and (3) are independently an alkyl or alkenyl radical of 16 to 22 carbon atoms.

It is advantageous to use a compound of formula (2), wherein A and Q are derived from a quaternising agent selected from the group consisting of chloroacetamide, ethylene chlorohydrin, ethylene bromohydrin, epichlorohydrin, epibromohydrin or, preferably, dimethyl sulfate.

In the process of this invention it is preferred to use a mixture of levelling assistants which, in addition to comprising the compounds of the formulae (1), (2) and (3), wherein the sum of p+q in formula (2) is preferably from 20 to 50, also contains an adduct of 60 to 100 moles of ethylene oxide with 1 mole of a $C_{15}$-$C_{20}$alkenyl alcohol.

It is also preferred to use a mixture of levelling assistants which contains the compounds of the formulae (1) and (2), wherein the sum of p+q in formula (2) is 4 to 10.

It is further preferred to use a mixture of levelling assistants which contains compounds of formula (2), wherein the sum of p+q in formula (2) is 30 to 40, and R' is a $C_{15}$-$C_{22}$alkyl radical.

The amount in which the levelling assistant or mixture of levelling assistants is added to the dyebaths can vary within wide limits; but in general an amount of 0.3 to 3 percent by weight, based on the fibre material, of the levelling assistant or mixture thereof, has proved advantageous.

The dyebaths may contain, as further assistants, mineral acids such as sulfuric acid, sulfamic acid or phosphoric acid, or organic acids, preferably lower aliphatic carboxylic acids such as formic acid, acetic acid or maleic acid. These acids are employed in particular for adjusting the pH of the dyebath. It is preferred to adjust the pH of 3 to 7 with an organic acid, preferably with acetic acid.

Dyeing is preferably carried out in the pH range from 4 to 6, most preferably from 4 to 5.

The dyebath may further contain, as assistants, salts other than alkali metal fluorides or ammonium fluorides, alkali metal fluorosilicates or ammonium fluorosilicates or alkali metal fluorobates or ammonium fluoroborates, in particular ammonium salts or alkali metal salts, for example ammonium sulfate, ammonium acetate or, preferably, sodium acetate or sodium sulfate. It is preferred to use 0.1 to 10 percent by weight of ammonium salt or alkali metal salt, based on the fibre material.

The 1:1 metal complex dyes suitable for use in the process of this invention are preferably 1:1 chromium complex azo dyes containing 1 to 3 sulfonic acid groups, in particular 1 to 2 sulfonic acid groups.

It is also possible to use mixtures of 1:1 chromium complex azo dyes which contain sulfo groups in the process of this invention. It is preferred to use a mixture of dyes as defined herein comprising (a) at least two dyes; or
(b) at least three dyes; or,
(c) for trichromatic dyeing, at least three dyes selected from yellow or orange, red blue dyes.

By trichromatic dyeing is meant the additive blending of suitably chosen yellow or orange, red and blue dyes with which each desired shade of the visible colour spectrum may be adjusted by appropriate choice of the quantity ratios.

1:1 Chromium complex azo dyes employed in the process of this invention are, in particular, those of the formula

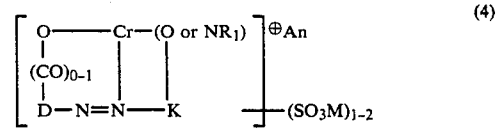 (4)

wherein $-(CO)\overline{_{0-1}}0-$ and $-(0-$ or $-NR_1)$ are linked to D and K adjacent to the azo bridge, D is the radical of a diazo component of the benzene or naphthalene series, K is the radical of a coupling component of the benzene, naphthalene or heterocyclic series or of the acetoacetarylide series, $R_1$ is hydrogen or an unsubstituted or substituted alkyl or phenyl radical, M is a cation and An is an anion.

In the process of this invention it is preferred to use sulfo group containing 1:1 chromium complex azo dyes of the formula (4), wherein D is a radical of the benzene or naphthalene series which is unsubstituted or substituted by halogen, $C_1$-$C_4$alkyl, $C_1$-$C_4$alkoxy, nitro or sulfamoyl, K is a phenyl, naphthyl, 1-phenyl-3-methylpyrazol-5-one, acetoacetamide, preferably acetoacetanilide, or quinoline radical, each unsubstituted or substituted by halogen, $C_1$-$C_4$alkyl, $C_1$-$C_4$alkoxy, $C_2$-$C_4$alkanoylamino, sulfamoyl or hydroxy, $R_1$ is hydrogen and M is an alkali metal cation.

The 1:1 metal complex azo dyes which contain sulfo groups employed in the process of this invention are either in the form of the free sulfonic acid or, preferably, of salts thereof.

Examples of suitable salts are alkali metal, alkaline earth metal or ammonium salts, or the salts of an organic amine. Representative examples are the sodium, lithium, potassium or ammonium salts or the salt of triethanolamine.

The 1:1 metal complex dyes which contain sulfo groups employed in the process of this invention are known per se and can be obtained by known methods.

If mixtures of dyes are used in the process of the invention, these may be prepared by mixing the individual dyes. Mixing is carried out in suitable mills, e.g. ball or pin mills, as well as in kneaders or mixers.

Further, the mixtures can also be prepared by spray drying aqueous dye mixtures.

In addition to containing the dye and the aforementioned assistants, the dyebaths may contain further conventional auxiliaries, for example wool protecting agents, wetting agents and antifoams.

The liquor to goods ratio may be chosen within a wide range from 1:6 to 1:80, preferably from 1:10 to 1:30.

Dyeing is carried out from an aqueous bath by the exhaust process, for example in the temperature range from 80° to 105° C. or 110° C. when using a wool protecting agent that splits off formaldehyde, preferably in the range from 98° to 103° C. The dyeing time is normally from 30 to 120 minutes.

Special apparatus is not required for carrying out the process of the invention. The conventional dyeing machines, e.g. for flocks, tops, hank yarn, packages, piece goods and carpets, may be used.

The levelling assistant and the alkali metal fluoride or ammonium fluoride, alkali metal fluorosilicate or ammonium fluorosilicate, alkali metal fluoroborate or ammonium fluoroborate is conveniently added to the aqueous dyebath and applied simultaneously with the dye. An alternative procedure is to treat the goods to be dyed first with the levelling assistant and then to dye the goods, in the same bath, after addition of the dye and of the alkali metal fluoride or ammonium fluoride, alkali metal fluorosilicate or ammonium fluorosilicate, alkali metal fluoroborate or ammonium fluoroborate. It is preferred to put the fibre material into a bath which contains acid and the assistant and has a temperature of 30° to 70° C. Then the dye or a dye mixture and the alkali metal fluoride or ammonium fluoride, alkali metal fluorosilicate or ammonium fluorosilicate, alkali metal fluoroborate or ammonium fluoroborate is added and the temperature of the dyebath is raised at a rate of 0.75° to 3° C. per minute, optionally with a temperature stop during the heating up phase, in order to dye in the indicated temperature range from 80° to 105° C., preferably for 30 to 120 minutes. Finally, the bath is cooled and the dyed material is rinsed and dried in conventional manner.

Naturally polyamide fibre material that may be dyed by the process of this invention is, in particular, wool and also wool/polyamide, wool/polyester, wool/cellulose or wool/polyacrylonitrile blends as well as silk. The fibre material may be in a very wide range of presentation, for example as loose material, tops, yarn and piece goods or carpets.

Synthetic polyamide material that may be dyed by the process of this invention comprises all known synthetic polyamides. The fibre material may be in a very wide range of presentation, for example as loose material, tops, yarn and piece goods or carpets.

A particularly preferred embodiment of the process of this invention comprises dyeing natural or synthetic polyamide fibre material, preferably wool, with at least one 1:1 chromium complex dye of formula (4), in the presence of sodium fluoride, ammonium fluorosilicate or sodium fluorosilicate, preferably in two to three times the amount by weight, based on the amount by weight of 1:1 chromium complex dye, and optionally in the presence of a levelling assistant comprising compounds of the formula (2) or a mixture of compounds of the formulae (1) and (2) or (1), (2) and (3), and in the presence of sodium acetate, ammonium acetate or sodium sulfate, in the pH range from 4 to 5.

Compared with the known processes for dyeing natural or synthetic polyamide fibre material, the process of this invention has the following advantages in addition to those already mentioned above. The material dyed under the dyeing conditions has better allround fastness properties, in particular better wetfastness properties. A further essential advantage is that dyes are taken up almost completely onto the fibre. When dyeing is complete, the dyebaths are almost completely exhausted.

The invention further relates to a composition for carrying out the process of the invention. The composition is a solid mixture containing at least one 1:1 metal complex azo dye which contains sulfo groups, in particular a 1:1 chromium complex dye, and an alkali metal fluoride or ammonium fluoride, alkali metal fluorosilicate or ammonium fluorosilicate, or alkali metal fluoroborate or ammonium fluoroborate.

The composition of this invention is prepared by mixing a 1:1 chromium complex dye which contains sulfo groups with an alkali metal fluoride or ammonium fluoride, alkali metal fluorosilicate or ammonium fluorosilicate, or alkali metal fluoroborate or ammonium fluoroborate. Mixing is carried out, for example, in suitable mills, e.g. ball or pin mills, as well as in kneaders or mixers.

Preferred compositions contain at least one 1:1 chromium complex dye and sodium or ammonium fluoride or sodium or ammonium fluorosilicate.

The preferred 1:1 chromium complexes in the composition of this invention are those of the formula (4).

The solid mixtures can be used for dyeing natural or synthetic polyamide fibre materials.

The invention is illustrated by the following Examples, in which parts and percentages are by weight. The relationship of parts by weight to parts by volume is the same as that of the gram to the cubic centimeter. The indicated amounts of dye refer to commercially available dye.

EXAMPLE 1

800 parts of worsted spun yarn are pretreated for 15 minutes at 50° C. in a dyebath which contains, in 20,000 parts of deionised water of 50° C., 32 parts of 80% acetic acid, 20 parts of crystalline sodium acetate and 12 parts of a levelling assistant comprising
14.6 parts of the anionic compound of the formula

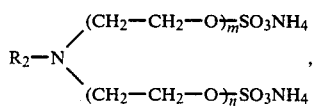

wherein $R_2$ is the hydrocarbon radical of tallow fatty amine, $m+n=8$;
21.0 parts of the quaternary compound of the formula

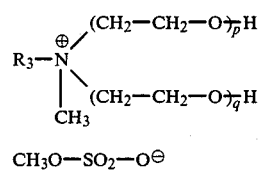

$p+q=34$, wherein $R_3$ is a $C_{20}$-$C_{22}$ hydrocarbon radical;
7.7 parts of the reaction product of oleyl alcohol with 80 moles of ethylene oxide; and
7 parts of the compound of the formula

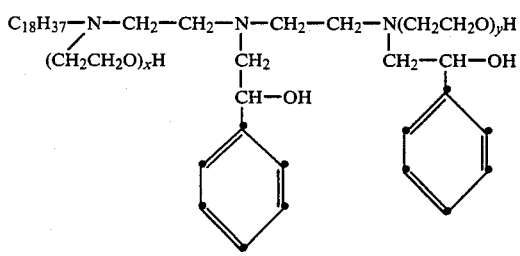

$x+y=c.$ 100 and 49.7 parts of water, based on 100 parts of the levelling assistant. After addition of a warm solution of 50° C. of 5.92 parts of the 1:1 chromium complex of the dye of the formula

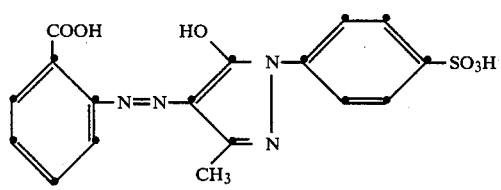

5.12 parts of the 1:1 chromium complex of the dye of the formula

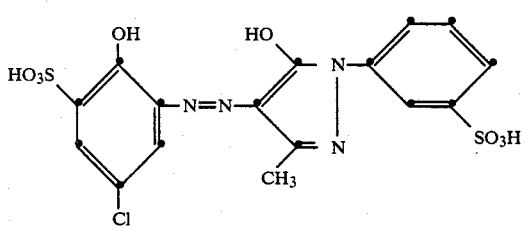

2.0 parts of the 1:1 chromium complex of the dye of the formula

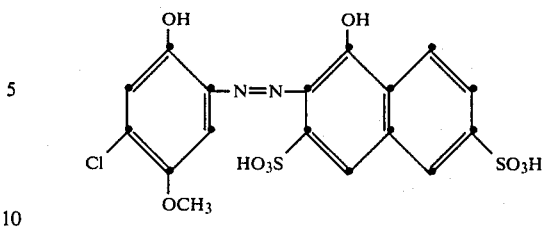

and 3.0 parts of the 1:1 chromium complex of the dye of the formula

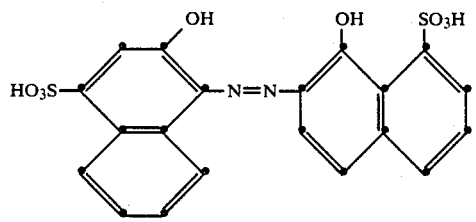

and 37 parts of sodium fluoride in 1000 parts of water, the dyebath is kept for 10 minutes at 50° C. and then heated to 98° C. at a heating-up rate of 1° C./min. The pH is 4.4 at the commencement of dyeing. After a dyeing time of 90 minutes at 98° C., the brown wool yarn is rinsed first for 10 minutes at 50° C. and then for 10 minutes at room temperature, and dried in conventional manner. The pH is 4.5 at the end of dyeing. The medium brown dyeing obtained has excellent levelness and the dyed yarn has a full, soft handle. The residual liquor is practically colourless.

A dyeing obtained on yarn by the above process with the same dyes, but without the addition of sodium fluoride, is highly unlevel and quite markedly weaker. The residual liquor is still noticeably coloured.

EXAMPLE 2

800 parts of worsted spun yarn are pretreated for 15 minutes at 50° C. in a dyebath which contains, in 20,000 parts of water of 50° C., 64 parts of sodium sulfate, 24 parts of $(NH_4)_2SiF_6$ and 12 parts of a levelling assistant comprising
24.0 parts of the anionic compound of the formula

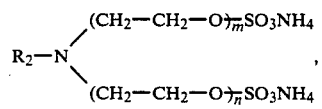

wherein $R_2$ is $C_{16}$-$C_{18}$ hydrocarbon carbon radical and the sum of m+n is 7;
24.0 parts of the quaternary compound of the formula

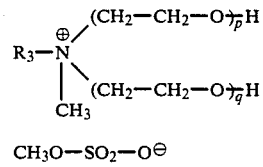

$p+q=34$, wherein $R_3$ is a $C_{20}$-$C_{22}$ hydrocarbon radical;
5.0 parts of ammonium chloride 3.0 parts of oxalic acid,
and 44 parts of water, based on 100 parts of the levelling assistant. After addition of a solution of 4.4 parts of the 1:1 chromium complex of the dye of the formula

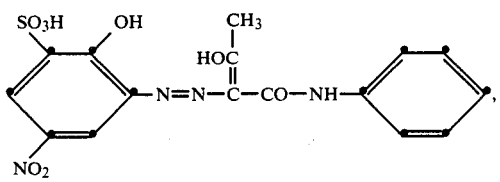

4.8 parts of the 1:1 chromium complex of the dye of the formula

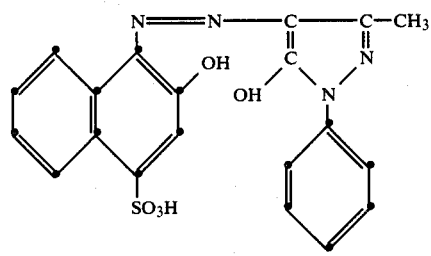

1.2 parts of the 1:1 chromium complex of the dye of the formula

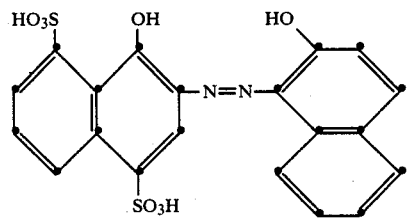

and 1.3 parts of the 1:1 chromium complex of the dye of the formula

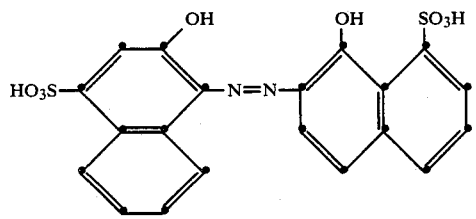

the dyebath is kept for 10 minutes at 50° C. and then heated to 98° C. at a heating-up rate of 0.8° C./min. The pH is 4.6 at the commencement of dyeing. After a dyeing time of 90 minutes at 98° C., the bath is cooled to 50° C. and drained off. The brown wool yarn is rinsed first for 10 minutes at 50° C. and then for 10 minutes at room temperature, and dried in conventional manner. The medium brown dyeing obtained has excellent levelness and has good fastness properties.

EXAMPLE 3

800 parts of worsted spun yarn are pretreated for 15 minutes at 50° C. in a dyebath which contains, in 20,000 parts of water of 50° C., 64 parts of sodium sulfate, 25 parts of Na₂SiF₆, 18 parts of 80% acetic acid and 12 parts of the levelling assistant employed in Example 2.

After addition of a solution of 3.85 parts of the 1:1 chromium complex of the dye of the formula

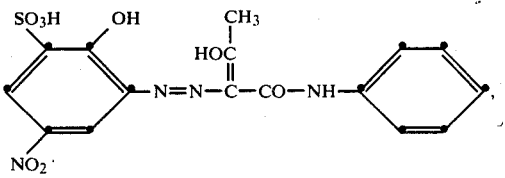

4 parts of the 1:1 chromium complex of the dye of the formula

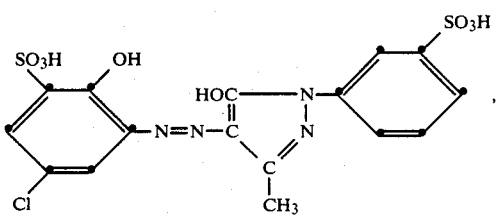

2 parts of the 1:1 chromium complex of the dye of the formula

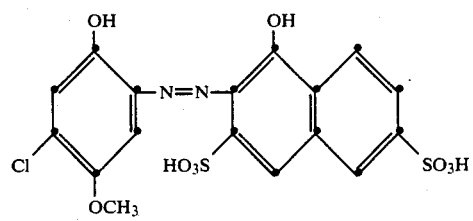

and 3 parts of the 1:1 chromium complex of the dye of the formula

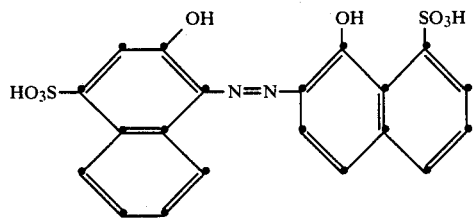

the dyebath is kept for 10 minutes at 50° C. and then heated to 70° C. at a heating-up rate of 1° C./min, kept for 20 minutes at 70° C. and then heated to 85° C. at a rate of 1° C./min. The pH is 4.5 at the commencement of dyeing. After a dyeing time of 120 minutes at 85° C., the bath is cooled to 50° C. and drained off. The brown wool yarn is rinsed first for 10 minutes at 50° C. and then for 10 minutes at room temperature, and dried in conventional manner. The full brown dyeing obtained has excellent levelness and has good fastness properties. A dyeing obtained on yarn by the above process with the same dyes, but without the addition of Na₂SiF₆, is highly unlevel and quite substantially weaker.

EXAMPLE 4

800 parts of worsted spun yarn are pretreated for 15 minutes at 50° C. in a dyebath which contains, in 20,000 parts of water of 50° C., 64 parts of sodium sulfate, 25 parts of Na₂SiF₆, 20 parts of 80% acetic acid and 12
parts of the levelling assistant comprising
8.0 parts of the compound of the formula

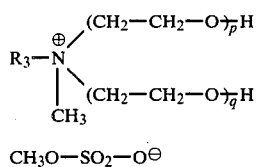

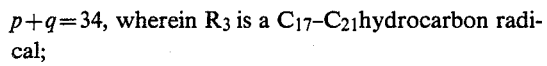

$p+q=34$, wherein $R_3$ is a $C_{17}$–$C_{21}$hydrocarbon radical;

30.0 parts of N,N'-dimethylolethylene urea, 0.7 part of the adduct of 5 moles of ethylene oxide and 1 mole of 2-ethyl-n-hexanol, 2.0 parts of a sulfated fatty amine polyglycol ether and 59.3 parts of water, based on 100 parts of levelling assistant.

After addition of a solution of 7.2 parts of the 1:1 chromium complex of the dye of the formula

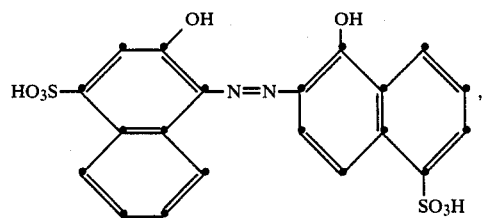

2.1 parts of the 1:1 chromium complex of the dye of the formula

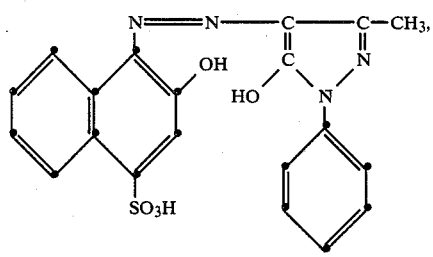

1.5 parts of the 1:1 chromium complex of the dye of the formula

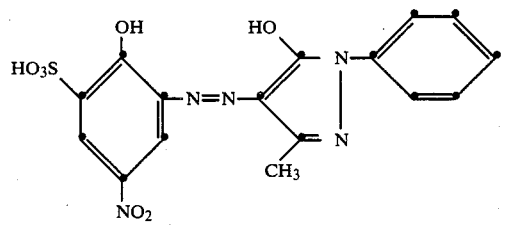

and 5.1 parts of the 1:1 chromium complex of the dye of the formula

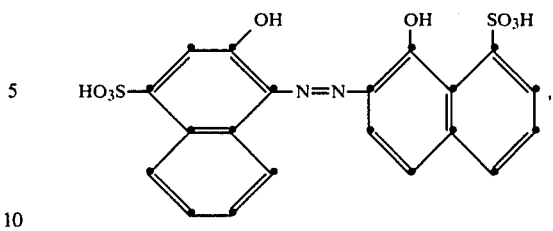

the dyebath is kept for 10 minutes at 50° C. and then heated to 70° C. at a heating-up rate of 1° C./min, then kept for 20 minutes at 70° C. and subsequently heated to 98° C. at a heat-up rate of 1° C./min. The pH is 4.3 at the commencement of dyeing. After a dyeing time of 90 minutes at 98° C., the dyebath is cooled to 60° C. and drained off. The navy blue wool yarn is rinsed twice for 10 minutes at 50° C. and then for 5 minutes at room temperature, and dried in conventional manner. The navy blue dyeing obtained has excellent levelness and has good fastness properties.

EXAMPLES 5

100 parts of polyamide 6,6 textured tricot are pretreated for 10 minutes in a dyebath which contains, in 4000 parts of water of 40° C., 1 part of Na₂SiF₆, 4 parts of ammonium acetate and acetic acid to adjust the pH to 4.5. After addition of a solution of 0.45 part of the 1:1 chromium complex of the dye of the formula

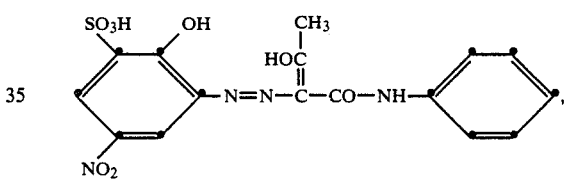

0.55 part of the 1:1 chromium complex of the dye of the formula

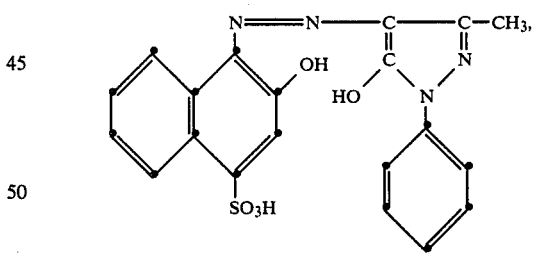

0.16 part of the 1:1 chromium complex of the dye of the formula

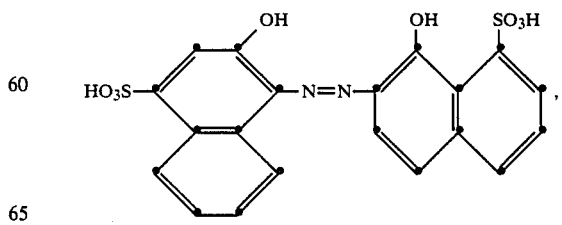

the dyebath is heated to 98° C. over the course of 45 minutes. Dyeing is carried out for 90 minutes at 98° C.

and the bath is then cooled to 60° C. The medium brown dyeing obtained is somewhat purer and fuller than one obtained under the same conditions without the addition of $Na_2SiF_6$.

The present invention relates to a novel process for the non-skittery and level dyeing of natural and synthetic polyamide fibre materials from an aqueous liquor with mixtures of 1:1 metal complex dyes which contain sulfo groups and metal-free dyes which contain sulfo groups, in the presence of a source of fluoride ions such as an alkali metal or ammonium fluoride, an alkali metal or ammonium fluorosilicate, an alkali metal or ammonium fluoroborate, an alkali metal or ammonium fluorozirconate or an alkali metal or ammonium fluorosulfonate, and optionally in the presence of an assistant, in which process dyeing is carried out at a fibre-preserving pH value in the range from 3 to 7 with virtually complete exhaustion of the dyebath, and the dyeing so obtained has good allround fastness properties, in particular good fastness to wet processing and light. The invention further relates to the material dyed by the novel process and to a composition for carrying out said process.

The disadvantage of the conventional methods of dyeing natural or synthetic polyamide fibre materials with 1:1 metal complex dyes or mixtures thereof with metal-free acid dyes is that these dyes or mixtures must be applied in the pH range from about 1.9 to 2.8 in order to obtain level dyeings. In addition to the duration of dyeing, the pH of the dyebath is of decisive importance for dyeing natural and synthetic polyamide fibre materials, especially for dyeing wool, as these fibre materials, again in particular wool, are severely attacked both in the strongly acidic and in the strongly alkaline pH range.

Surprisingly, there has now been found a novel process that does not have the shortcoming referred to above and which makes it possible to dye natural or synthetic polyamide materials, in simple manner, in the fibre-preserving pH range from 3 to 7, preferably from 3 to 6 and, most preferably, from 3.5 to 5.

Accordingly, the present invention relates to a process for dyeing natural or synthetic polyamide fibre material from an aqueous liquor with mixtures of dyes, in the presence of an alkali metal salt or an ammonium salt and optionally in the presence of an assistant, which process comprises dyeing said fibre material with a mixture containing at least one 1:1 metal complex dye which contains sulfo groups and at least one metal-free dye which contains sulfo groups, in the presence of an alkali metal or ammonium fluoride, an alkali metal or ammonium fluorosilicate, an alkali metal or ammonium fluoroborate, an alkali metal or ammonium fluorozirconate or an alkali metal or ammonium fluorosulfonate, at a pH value in the range from 3 to 7.

The eligible 1:1 metal complex dyes which contain sulfo groups are preferably monoazo or disazo dyes which contain a chromium ion as metal ions. It is also possible to use 1:1 metal complex azomethine dyes which preferably contain a chromium ion.

The eligible metal-free dyes which contain sulfo groups are preferably acid to strongly acid dyes selected from the series of the monoazo or polyazo, anthraquinone, triphenylmethane or xanthene dyes that may contain the customary substituents of acid dyes. These sulfo-containing metal-free dyes may be substituted by fibre-reactive radicals.

Depending on the desired depth of shade, the amounts in which the dye mixtures are added to the dyebaths may vary within wide limits. In general, amounts from 0.01 to 10 percent by weight, based on the goods to be dyed, of one or more dye mixtures are advantageous.

It has long been known to dye natural or synthetic polyamide fibre materials with 1:1 metal complex dyes or mixtures thereof with metal-free dyes in the presence of an alkali metal sulfate or alkali metal chloride, for example sodium sulfate and sodium chloride, and optionally of an assistant. Surprisingly, the use of an alkali metal or ammonium fluoride, of an alkali metal or ammonium fluorosilicate, of an alkali metal or ammonium fluoroborate, of an alkali metal or ammonium fluorozirconate or of an alkali metal or ammonium fluorosulfonate, optionally in the presence of an assistant, makes it possible to dye these materials in a fibre-preserving pH range to give level dyeings with good penetration of the dye.

In the process of this invention, it is preferred to use sodium or potassium fluoride as alkali metal fluoride.

The alkali metal fluorosilicate or ammonium fluorosilicate employed in the process of this invention is the alkali metal salt or ammonium salt of hexafluorosilicic acid. It is preferred to use $Na_2SiF_6$, $K_2SiF_6$ or $(NH_4)_2SiF_6$.

The alkali metal fluoroborate or ammonium fluoroborate employed in the process of the invention is the alkali metal salt or ammonium salt or fluoroboric acid. It is preferred to use $NaBF_4$, $KBF_4$ or $NH_4BF_4$.

The alkali metal or ammonium fluorozirconate employed in the process of this invention is an alkali metal hexafluorozirconate or ammonium hexafluorozirconate, preferably $K_2(ZrF_6)$.

The alkali metal or ammonium fluorosulfonate employed in the process of this invention is an alkali metal salt or an ammonium salt of fluorosulfonic acid, and is preferably $NaFSO_3$, $KFSO_3$ or $NH_4FSO_3$.

Preferred embodiments of the process of this invention comprise:
(a) dyeing in the presence of an alkali metal fluoride or ammonium fluoride, preferably sodium or potassium fluoride or ammonium fluoride, optionally in the presence of an assistant or of a mixture of assistants,
(b) dyeing in the presence of an alkali metal fluorosilicate or ammonium fluorosilicate, preferably sodium or potassium fluorosilicate or ammonium fluorosilicate,
(c) dyeing in the presence of an alkali metal fluoroborate or ammonium fluoroborate,
(d) dyeing in the presence of an alkali metal hexafluorozirconate or ammonium fluorozirconate, preferably $K_2(ZrF_6)$,
(e) dyeing in the presence of an alkali metal fluorosulfonate or ammonium fluorosulfonate, preferably $KFSO_3$.

A particularly preferred embodiment of the process of this invention comprises dyeing in the presence of an alkali metal fluoride or ammonium fluoride, an alkali metal fluorosilicate or ammonium fluorosilicate, or of an alkali metal fluoroborate or ammonium fluoroborate.

The amount in which the alkali metal or ammonium fluoride, alkali metal or ammonium fluorosilicate, alkali metal or ammonium fluoroborate, alkali metal or ammonium fluorozirconate or alkali metal or ammonium fluorosulfonate is added to the dyebaths may vary within wide limits. In general, half to four times the amount by weight, preferably one to three times the amount by weight and, most preferably, two to three times the amount by weight, of alkali metal or ammonium fluoride, alkali metal or ammonium fluorosilicate, of alkali metal or ammonium fluoroborate, alkali metal or ammonium fluorozirconate or alkali metal or ammonium fluorosulfonate, based on the amount by weight of dye, is advantageous.

The assistants which may be used in the process of this invention are known per se and are prepared by known methods. Preferably, they are levelling assistants or mixtures of different levelling assistants. Suitable levelling assistants are anionic, cationic, nonionic and amphoteric compounds or mixtures thereof.

Examples of suitable anionic compounds are: substituted naphthalenesulfonic acids, sulfonic acid hemiesters of ethoxylates, salts of alkanesulfonic acids of longer chain length, salts of alkylarylsulfonic acids, in particular dodecylbenzenesulfonic acids, fatty acid amide sulfonic acids, and sulfuric acid hemiesters of fatty amine polyglycol ethers. Representative examples of cationic compounds are: polyglycol ethers of fatty amines, polyglycol ethers of fatty acid amide-amines, and quaternary ammonium compounds. Typical examples of nonionic compounds are: polyglycol ethers of fatty alcohols, of alkylphenols, of resinic acids, and of fatty acid alkylolamides. Typical examples of amphoteric compounds are: reaction products of ethoxylated fatty amines and hydroxyethanesulfonic acids, reaction products of phenol and styrene, and polyethylene glycol di-fatty acid esters.

It is preferred to use levelling assistant compositions containing compounds of the formula

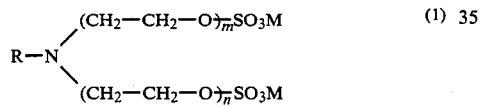

(1)

wherein R is an alkyl or alkenyl radical of 12 to 22 carbon atoms, M is hydrogen, an alkali metal or ammonium cation, and m and n are integers, the sum of $m+n$ being from 2 to 14; or compounds of the formula

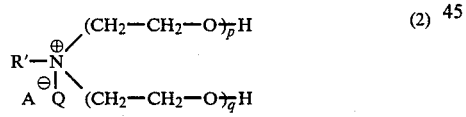

(2)

wherein R' independently of R has the meaning of R, A is an anion, Q is an unsubstituted or substituted alkyl radical and p and q are integers, the sum of $p+q$ being from 2 to 50; or compounds of the formula

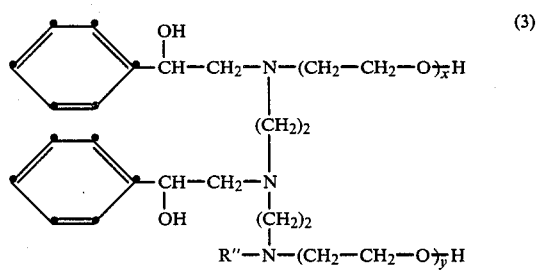

(3)

wherein R" independently of R has the meaning of R and x and y are integers, the sum of $x+y$ being from 80 to 140; or a mixture containing compounds of the formulae (1) and (2) or a mixture containing compounds of the formulae (1), (2) and (3).

It is particularly preferred to use a mixture of levelling assistants comprising 5 to 70 parts by weight of a compound of formula (1), 15 to 60 parts by weight of the compound of formula (2), and 5 to 60 parts by weight of the compound of formula (3), based on 100 parts by weight of said mixture, wherein R, R' and R" in formulae (1), (2) and (3) are independently an alkyl or alkenyl radical of 16 to 22 carbon atoms.

It is advantageous to use a compound of formula (2), wherein A and Q are derived from a quaternising agent selected from the group consisting of chloroacetamide, ethylene chlorohydrin, ethylene bromohydrin, epichlorohydrin, epibromohydrin or, preferably, dimethyl sulfate.

In the process of this invention it is preferred to use a mixture of levelling assistants which, in addition to comprising the compounds of the formulae (1), (2) and (3), wherein the sum of $p+q$ in formula (2) is preferably from 20 to 50, also contains an adduct of 60 to 100 moles of ethylene oxide with 1 mole of a $C_{15}$-$C_{20}$alkenyl alcohol.

It is also preferred to use a mixture of levelling assistants which contains the compounds of the formulae (1) and (2), wherein the sum of $p+q$ in formula (2) is 4 to 10.

It is further preferred to use a mixture of levelling assistants which contains compounds of formula (2), wherein the sum of $p+q$ in formula (2) is 30 to 40, and R' is a $C_{15}$-$C_{22}$alkyl radical.

The amount in which the levelling assistant or mixture of levelling assistants is added to the dyebaths can vary within wide limits; but in general an amount of 0.3 to 3 percent by weight, preferably of 1 or 2 percent by weight, based on the fibre material, of the levelling assistant or mixture thereof, is advantageous.

The dyebaths may contain, as further assistants, mineral acids such as sulfuric acid, sulfamic acid or phosphoric acid, or organic acids, preferably lower aliphatic carboxylic acids such as formic acid, acetic acid or maleic acid. These acids are employed in particular for adjusting the pH of the dyebath. It is preferred to adjust the pH of 3 to 7 with an organic acid, preferably with acetic acid or formic acid.

Dyeing is preferably carried out in the pH range from 3 to 6, preferably from 3.5 to 5 and, most preferably, from 4 to 5.

The dyebath may contain, as further assistants, a salt other than an alkali metal or ammonium fluoride, alkali metal or ammonium fluorosilicate, alkali metal or ammonium fluoroborate, alkali metal or ammonium fluorozirconate or alkali metal or ammonium fluorosulfonate, in particular an ammonium salt or alkali metal salt, for example ammonium sulfate, ammonium acetate or, preferably, sodium acetate or sodium sulfate. It is preferred to use 0.1 to 10 percent by weight of ammonium salt or alkali metal salt, based on the fibre material.

The dye mixtures employed in the proces of this invention are preferably mixtures that contain at least one 1:1 chromium complex azo or azomethine dye containing 1 to 3, preferably 1 or 2, sulfo groups, and at least one metal-free dye containing 1 or 2 sulfo groups.

The sulfo-containing metal-free dyes employed in the process of this invention are preferably those having good migration properties. The migrating power of these dyes shall correspond to those of the 1:1 chromium complex azo or azomethine dyes.

A range from 25 to 50% has proved advantageous as a good migrating power (dyeing at pH 4 to 5 and measured as difference in strength).

The migrating power is determined on wool by treating a sample which has been dyed to 1/1 standard depth of shade, together with an undyed sample of the same weight, in a blank bath.

The treatment conditions for determining the migrating power match those indicated in Example 1. Evaluation is made by spectrophotometric determination of the amount of dye present on the originally undyed wool in percent of the originally dyed wool.

Examples of metal-free sulfo-containing dyes are C.I. Acid Blue 1, 7, 13, 23, 40, 40:1, 43, 45, 47, 72, 147, 258 and 277; C.I. Acid Red 1, 5, 37, 42, 52, 57 and 361; C.I. Acid Yellow 10, 17, 25, 27, 99 and 219; C.I. Acid Orange 1, 3 and 156; C.I. Acid Green 3, 9 and 16; C.I. Acid Violet 9 and 36; C.I. Acid Brown 10, 11 and 248.

In the process of this invention it is also possible to use mixtures of several dye mixtures as defined herein.

A preferred mixture of dye mixtures as defined herein is:

(a) at least two 1:1 chromium complex azo or azomethine dyes and at least one sulfo-containing metal-free dye; and (b) at least three 1:1 chromium complex azo or azomethine dyes and at least one sulfo-containing metal-free dye; or (c) for trichromatic dyeing, at least three 1:1 chromium complex azo or azomethine dyes selected from dyes that give yellow or orange, red and blue dyeings, and at least one metal-free dye selected from dyes that give yellow or orange and/or red and/or blue dyeings.

By trichromatic dyeing is meant the additive blending of suitably chosen dyes that give yellow or orange, red and blue dyeings with which any desired shade of the visible colour spectrum can be matched by suitable choice of the quantity ratios of the dyes.

1:1 Chromium complex azo or azomethine dyes employed in the process of this invention are, in particular, those of the formula

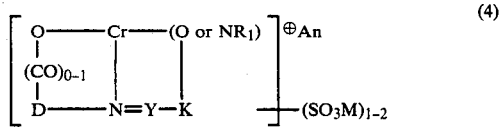

(4)

wherein —(CO)$_{\overline{0\text{-}1}}$O— and —(O— or —NR$_1$) are linked to D and K adjacent to the azo bridge, D is the radial of a diazo component of the benzene or naphthalene series, K is the radical of a coupling component of the benzene, naphthalene or heterocyclic series or of the acetoacetarylide series, R$_1$ is hydrogen or an unsubstituted or substituted alkyl or phenyl radical, M is a cation and An is an anion, and Y is a nitrogen atom or the —CH— group.

In the process of this invention it is preferred to use sulfo-containing 1:1 chromium complex azo or azomethine dyes of the formula (4), wherein D is a radical of the benzene or naphthalene series which is unsubstituted or substituted by halogen, C$_1$–C$_4$alkyl, C$_1$–C$_4$alkoxy, nitro or sulfamoyl, K is a phenyl, naphthyl, 1-phenyl-3-methylpyrazol-5-one, acetoacetamide, preferably acetoacetanilide, or a quinoline radical, each unsubstituted or substituted by halogen, C$_1$–C$_4$alkyl, C$_1$–C$_4$alkoxy, C$_2$–C$_4$alkanoylamino, sulfamoyl or hydroxy, R$_1$ is hydrogen and M is an alkali metal cation.

Y in formula (4) is preferably a nitrogen atom.

The sulfo-containing metal-free dyes employed in the process of this invention are preferably those of the dyestuff series referred to above, which dyes may be substituted by e.g. C$_1$–C$_4$alkyl groups such as methyl, ethyl, propyl, isopropyl and butyl, or by C$_1$–C$_4$alkoxy groups such as methoxy, ethoxy, propoxy, isopropoxy and butoxy, or C$_1$–C$_6$acylamino groups such as acetylamino and propionylamino, benzoylamino, amino, C$_1$–C$_4$alkylamino, phenylamino, C$_1$–C$_4$alkoxycarbonyl, nitro, acetyl, cyano, trifluoromethyl, halogen such as fluorine, chlorine and bromine, sulfamoyl, carbamoyl, ureido, hydroxy, carboxy and sulfomethyl.

The sulfo-containing metal-free dyes may also be substituted by one or more fibre-reactive radicals. Examples of suitable fibre-reactive radicals are those listed in German Offenlegungsschrift 29 13 102.

In the process of this invention it is preferred to use mixtures of sulfo-containing 1:1 metal complex dyes and sulfo-containing metal-free dyes in the weight ratio of 40:60 to 95:5.

The sulfo-containing dyes employed in the process of this invention are either in the form of the free sulfonic acid or, preferably, of the salts thereof.

Examples of suitable salts are alkali metal, alkaline earth metal or ammonium salts, or the salts of an organic amine. Representative examples are the sodium, lithium, potassium or ammonium salts or the salt of triethanolamine.

The sulfo-containing 1:1 metal complex dyes and the sulfo-containing metal-free dyes employed in the process of this invention are known per se and can be obtained by known methods.

The mixtures of dyes used in the process of the invention may be prepared by mixing the individual dyes. Mixing is carried out in suitable mills, e.g. ball or pin mills, as well as in kneaders or mixers.

Further, the mixtures can also be prepared by spray drying aqueous dye mixtures.

In addition to containing the dye and the aforementioned assistants, the dyebaths may contain further conventional auxiliaries, for example wool protecting agents, wetting agents and antifoams.

The liquor to goods ratio may be chosen within a wide range from 1:6 to 1:80, preferably from 1:10 to 1:30.

Dyeing is carried out from an aqueous bath by the exhaust process, for example in the temperature range from 80° to 105° C. or 110° C. when using a wood protecting agent that splits off formaldehyde, preferably in the range from 98° to 103° C. The dyeing time is normally from 30 to 120 minutes.

Special apparatus is not required for carrying out the process of the invention. The conventional dyeing machines, e.g. for flocks, tops, hank yarn, packages, piece goods and carpets, may be used.

The levelling assistant and the alkali metal or ammonium fluoride, alkali metal or ammonium fluorosilicate, alkali metal or ammonium fluoroborate, alkali metal or ammonium fluorozirconate or alkali metal or ammonium fluorosulfonate is conveniently added to the aqueous dyebath and applied simultaneously with the dye. An alternative procedure is to treat the goods to be dyed first with the levelling assistant and then to dye the goods, in the same bath, after addition of the dye and of the alkali metal or ammonium fluoride, alkali metal or ammonium fluorosilicate, alkali metal or ammonium fluoroborate, alkali metal or ammonium fluorozirconate or alkali metal or ammonium fluorosulfonate. It is preferred to put the fibre material into a bath which contains acid and the assistant and has a temperature of 30° to 70° C. Then the dye mixture and the alkali metal or ammonium fluoride, alkali metal or ammonium fluorosilicate, alkali metal or ammonium fluoroborate, alkali metal or ammonium fluorozirconate or alkali metal or ammonium fluorosulfonate is added and the temperature of the dyebath is raised at a rate of 0.75° to 3° C. per minute, optionally with a temperature stop during the heating up phase, in order to dye in the indicated temperature range from 80° to 105° C., preferably for 30 to 120 minutes. Finally, the bath is cooled and the dyed material is rinsed and dried in conventional manner.

Natural polyamide fibre material that may be dyed by the process of this invention is, in particular, wool and also wool/polyamide, wool/polyester, wool/cellulose or wool/polyacrylonitrile blends as well as silk. The fibre material may be in a very wide range of presentation, for example as loose material, tops, yarn and piece goods or carpets.

Synthetic polyamide material that may be dyed by the process of this invention comprises all known synthetic polyamides. The fibre material may be in a very wide range of presentation, for example as loose material, tops, yarn and piece goods or carpets.

A particularly preferred embodiment of the process of this invention comprises dyeing natural or synthetic polyamide fibre material, preferably wool, with at least one dye mixture as defined above, in the presence of sodium fluoride, ammonium fluorosilicate or sodium fluorosilicate, preferably in two to three times the amount by weight, based on the amount by weight of 1:1 chromium complex dye, and optionally in the presence of a levelling assistant comprising compounds of the formula (2) or a mixture of compounds of the formulae (1) and (2) or (1), (2) and (3), and in the presence of sodium acetate, ammonium acetate or sodium sulfate, in the pH range from 4 to 5.

The sulfo-containing metal-free dyes used in the process of the present invention may contain one or more fibre-reactive groups. In the process of the invention it is preferred to use those mixtures of 1:1 metal complex dyes as defined herein, wherein the metal-free dyes are either all reactive dyes or are all devoid of fibre-reactive groups. It is most preferred to use sulfo-containing metal-free dyes that do not contain fibre-reactive groups.

A very particularly preferred embodiment of the invention comprises the use of dye mixtures consisting of those metal-containing and metal-free dyes which give dyeings of the same shade, i.e. for example the use of a mixture of at least one sulfo-containing 1:1 metal complex dye and at least one sulfo-containing metal-free dye, each of which dyes in a blue shade.

Compared with the known processes for dyeing natural or synthetic polyamide fibre material, the process of this invention has the following advantages in addition to those already mentioned above. The material dyed under the dyeing conditions has better allround fastness properties, in particular better wetfastness properties. A further essential advantage is that the dyes are taken up almost completely onto the fibre. When dyeing is complete, the dyebaths are almost completely exhausted.

The invention further relates to a composition for carrying out the process of the invention. The composition is a solid mixture containing at least one sulfo-containing 1:1 metal complex dye, in particular a 1:1 chromium complex dye, and at least one sulfo-containing metal-free dye, and an alkali metal or ammonium fluoride, alkali metal or ammonium fluorosilicate, alkali metal or ammonium fluoroborate, alkali metal or ammonium fluorozirconate or alkali metal or ammonium fluorosulfonate.

The composition of this invention is prepared by mixing a sulfo-containing 1:1 chromium complex dye and at least one sulfo-containing metal-free dye with an alkali metal or ammonium fluoride, alkali metal or ammonium fluorosilicate, alkali metal or ammonium fluoroborate, alkali metal or ammonium fluorozirconate or alkali metal or ammonium fluorosulfonate. Mixing is carried out, for example, in suitable mills, e.g. ball or pin mills, as well as in kneaders or mixers.

Preferred compositions contain sodium or ammonium fluoride or sodium or ammonium fluorosilicate, in addition to the dye mixture.

The solid mixtures can be used for dyeing natural or synthetic polyamide fibre materials. The same preferences apply to the solid mixtures as to the process.

The invention is illustrated by the following Examples, in which parts and percentages are by weight. The relationship of parts by weight to parts by volume is the same as that of the gram to the cubic centimeter. The indicated amounts of dye refer to commercially available dye.

EXAMPLE 1

800 parts of worsted spun yarn are pretreated for 15 minutes at 50° C. in a dyebath containing, in 20,000 parts of water of 50° C., 64 parts of sodium sulfate, 24 parts of $(NH_4)_2SiF_6$ and 12 parts of a levelling assistant consisting of:

24 parts of the anionic compound of formula

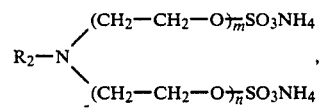

$R_2 = C_{16}-C_{18}$ hydrocarbon radical; $m+n=7$;

24 parts of the quaternary compound of formula

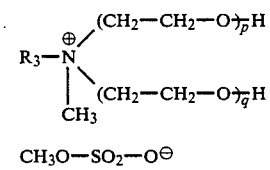

$p+q=34$, $R_3 = C_{20}-C_{22}$ hydrocarbon radical;

5 parts of ammonium chloride
3 parts of oxalic acid and
44 parts of water, based on 100 parts of levelling assistant.

After addition of a solution of
2.2 parts of the 1:1 chromium complex of the dye of formula 2.4 parts of the 1:1 chromium complex of the dye of formula

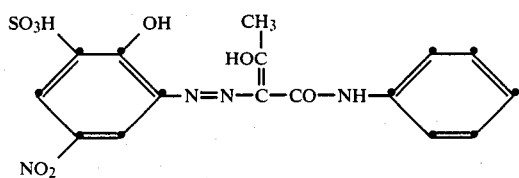

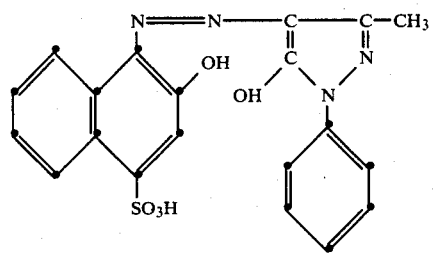

0.6 part of the 1:1 chromium complex of the dye of formula

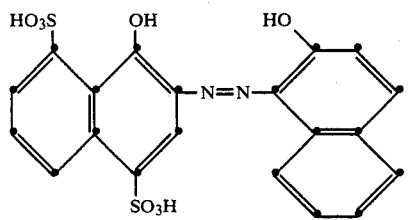

0.65 part of the 1:1 chromium complex of the dye of formula

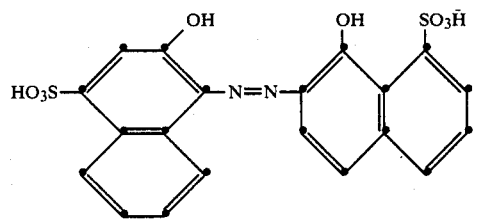

2.2 parts of the dye of formula

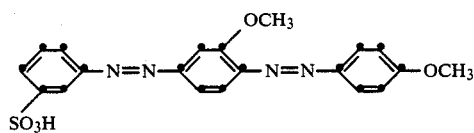

2.4 parts of the dye of formula

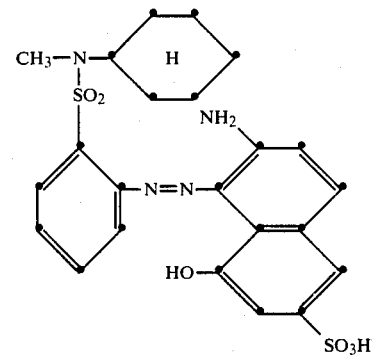

and 1.2 parts of the dye of formula

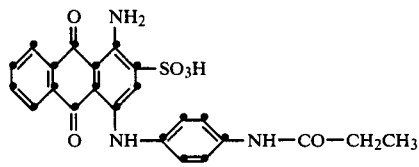

the dyebath is kept for 10 minutes at 50° C. and then heated to 98° C. at a rate of 0.8° C./minute. The pH is 4.6 at the commencement of dyeing. After a dyeing time of 90 minutes at 98° C., the dyebath is cooled to 50° C. and drained off. The brown wool yarn is rinsed first for 10 minutes at 50° C. and then for 10 minutes at room temperature and dried in conventional manner. The medium brown dyeing so obtained has excellent levelness and good fastness properties.

EXAMPLE 2

100 parts of wool fabric are pretreated for 15 minutes at 40° C. in a dyebath containing, in 2000 parts of water of 40° C., 8 parts of sodium sulfate, 1.2 parts of the levelling assistant employed in Example 1 and 1.5 parts of 85% formic acid. The pH of the bath is 4.3.

After addition of a solution of 1.9 parts of sodium fluoride and 0.695 part of the dye of formula

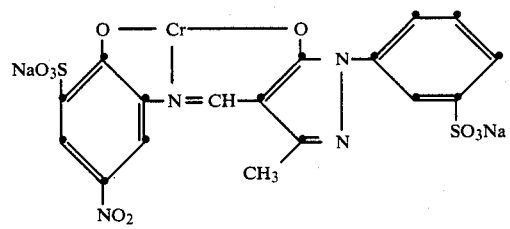

0.59 part of the dye of formula

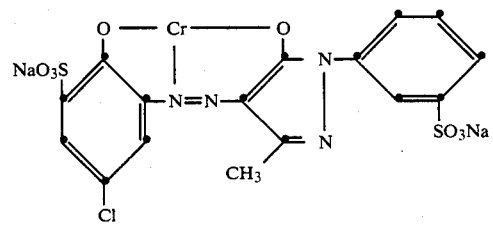

0.26 part of the dye of formula 0.31 part of the dye of formula

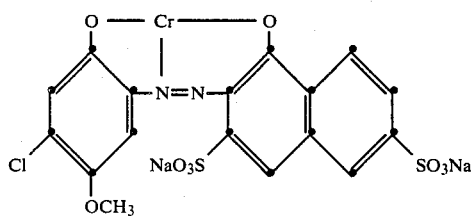

0.28 part of the dye of formula

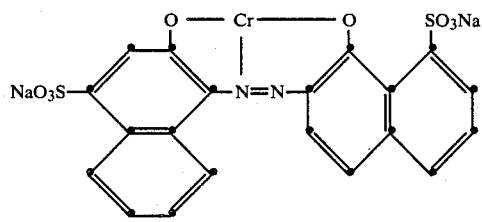

0.28 part of the dye of formula

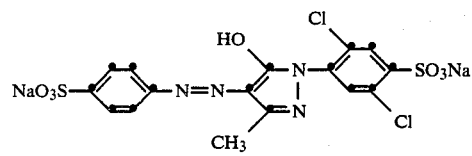

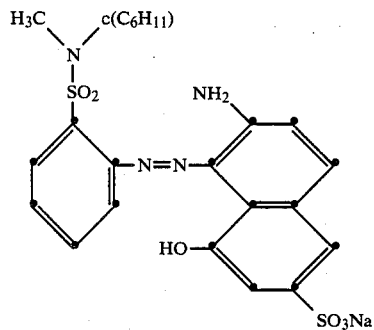

and 0.27 part of the dye of formula

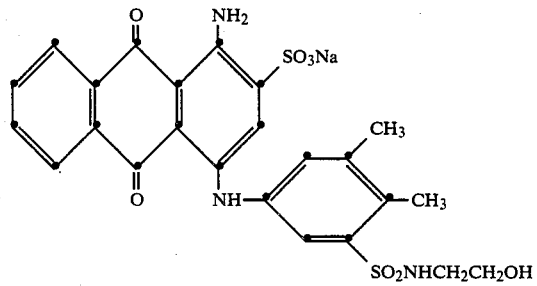

the dyebath is kept for a further 10 minutes at 40° C. and then heated to 70° C. at a rate of 1° C./min. After a dyeing time of 20 minutes at 70° C., the dyebath is heated to 100° C. and dyeing is carried out for 90 minutes at this temperature. The dyebath is then cooled to 60° C. and drained off. The brown wool fabric is rinsed first for 5 minutes at 50° C. and then for 5 minutes at room temperature and dried in conventional manner. The dyeing has excellent levelness and good fastness properties.

EXAMPLE 3

100 parts of wool fabric are pretreated for 10 minutes at 40° C. in a dyebath containing, in 1000 parts of water of 40° C., 8 parts of sodium sulfate, 1.5 parts of the levelling assistant employed in Example 1 and 2 parts of 85% formic acid. The pH of the bath is 3.8. After addition of a solution containing 1.2 parts of the dye of formula

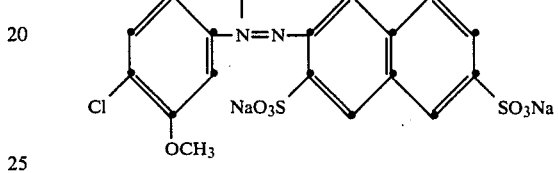

0.28 part of the dye of formula

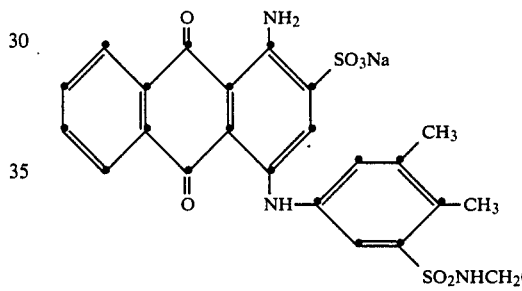

and 1.6 parts of $K_2(ZrF_6)$, the dyebath is kept for a further 10 minutes at 40° C. and then heated to 100° C. at a rate of 0.8° C./min. After a dyeing time of 90 minutes at 100° C., the dyebath is cooled to 60° C. and drained off. The blue wool fabric is rinsed and dried in conventional manner. The medium blue dyeing has excellent levelness and good fastness properties.

A comparably good result is obtained by using 1.8 parts of $Na_2SiF_6$ instead of 1.6 parts of $K_2(ZrF_6)$.

EXAMPLE 4

100 parts of wool fabric are pretreated for 15 minutes at 40° C. in a dyebath containing, in 1500 parts of water of 40° C., 8 parts of sodium sulfate, 1.5 parts of the levelling assistant of the following composition:

14.6 parts of the anionic compound of formula

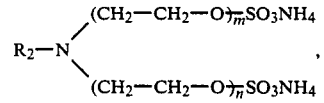

$R_2$ = hydrocarbon radical of tallow amine, $m+n=8$;

21 parts of the quaternary compound of formula

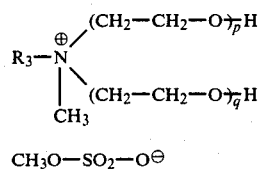

$p+q=34$, $R_3=C_{20}-C_{22}$ hydrocarbon radical;
7 parts of the adduct of oleyl alcohol with 80 moles of ethylene oxide; and
7 parts of the compound of formula

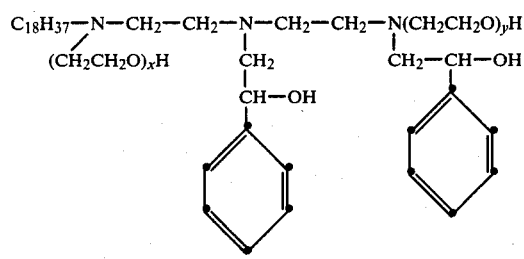

$x+y=c.$ 100, and 49.7 parts of water, based on 100 parts of levelling assistant mixture;
and 1.5 parts of 85% formic acid. The pH of the bath is 4.5. After addition of a solution containing 1.94 parts of NaF, 1.66 parts of the dye of formula

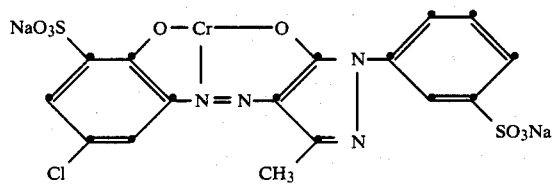

and 1.5 parts of the dye of formula

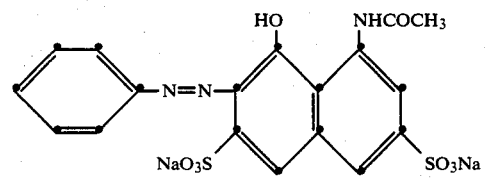

the dyebath is kept for a further 10 minutes at 40° C. and then heated to 100° C. at a rate of 0.8° C./min. After a dyeing time of 90 minutes at 100° C., the dyebath is cooled to 50° C. and drained off. The red wool fabric is rinsed and dried in conventional manner. The deep red dyeing so obtained has excellent levelness and good fastness properties.

EXAMPLE 5

100 parts of wool fabric are pretreated for 15 minutes at 40° C. in a dyebath containing, in 2000 parts of water of 40° C., 8 parts of sodium sulfate, 1.2 parts of the levelling assistant mixture employed in Example 1 and 1.5 parts of 85% formic acid. The pH of the bath is 4.3. To this dyebath are then added 1.4 parts of a solid mixture consisting of:
0.425 part of NaF,
0.28 part of the dye of formula

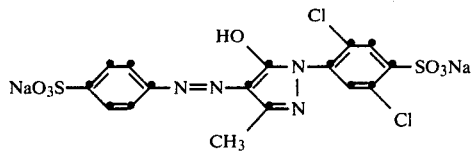

and 0.695 part of the dye of formula

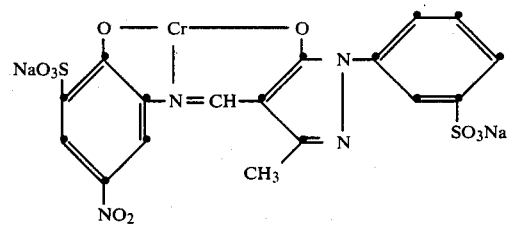

1.56 parts of a solid mixture consisting of:
0.69 part of NaF,
0.59 part of the dye of formula

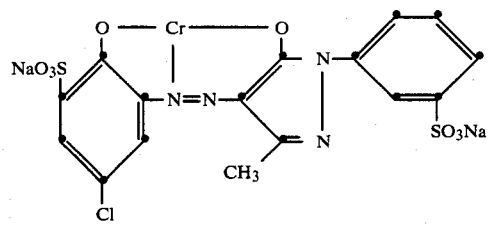

and 0.28 part of the dye of formula

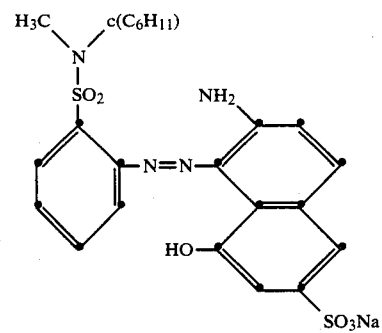

and 1.63 parts of a solid mixture consisting of
0.79 part of NaF,
0.26 part of the dye of formula

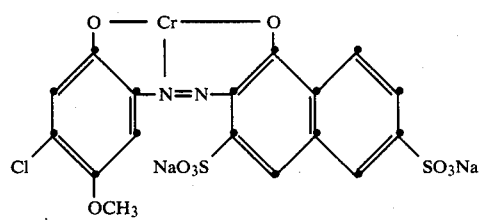

0.31 part of the dye of formula

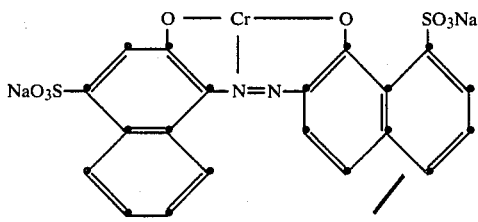

and 0.27 part of the dye of formula

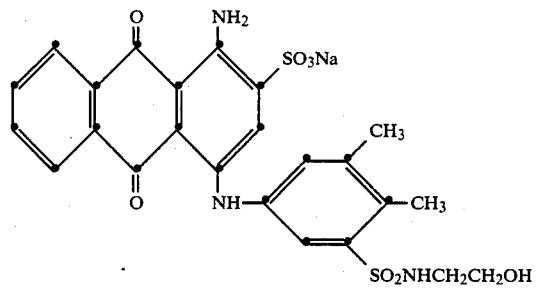

The dyebath is kept for a further 10 minutes at 40° C. and then heated to 70° C. at a rate of 1° C./min. After a dyeing time of 20 minutes at 70° C., the dyebath is heated to 100° C. and dyeing is carried out for 90 minutes at this temperature. The dyebath is then cooled to 60° C. and drained off. The brown wool fabric is rinsed first for 5 minutes at 50° C. and then for 5 minutes at room temperature and dried in conventional manner. The dyeing has excellent levelness and good fastness properties.

What is claimed is:

1. A process for dyeing natural or synthetic polyamide fibre material from an aqueous liquor with mixtures of dyes, in the presence of an alkali metal salt or an ammonium salt and optionally in the presence of an assistant, which process comprises dyeing said fibre material with a mixture containing at least one 1:1 metal complex dye which contains sulfo groups and at least one metal-free dye which contains sulfo groups, in the presence of an alkali metal or ammonium fluoride, an alkali metal or ammonium fluorosilicate, an alkali metal or ammonium fluoroborate, an alkali metal or ammonium fluorozirconate or an alkali metal or ammonium fluorosulfonate, at a pH value in the range from 3 to 7.

2. A process according to claim 1, wherein dyeing is carried out in the presence of sodium fluoride or potassium fluoride.

3. A process according to claim 1, which comprises using half to four times the amount by weight, of alkali metal or ammonium fluoride, alkali metal or ammonium fluorosilicate, alkali metal or ammonium fluoroborate, alkali metal or ammonium fluorozirconate or alkali metal or ammonium fluorosulfonate, based on the amount by weight of dye employed.

4. A process according to claim 1, wherein the pH range of 3 to 7 is adjusted with an organic acid, and which optionally comprises using, in addition to an alkali metal or ammonium fluoride, alkali metal or ammonium fluorosilicate, alkali metal or ammonium fluoroborate, alkali metal or ammonium fluorozirconate or alkali metal or ammonium fluorosulfonate, another ammonium or alkali metal salt.

5. A process according to claim 1, wherein dyeing is carried out in a pH range from 3 to 6.

6. A process according to claim 1, wherein dyeing is carried out in the presence of a levelling assistant or a mixture of levelling assistants.

7. A process according to claim 6, which comprises using 0.3 to 3 percent by weight based on the fibre material, of levelling assistant or levelling assistant mixture.

8. A process according to claim 1, which comprises using a dye mixture that contains at least one 1:1 chromium complex azo or azomethine dye containing 1 to 3 sulfo groups and at least one metal-free dye containing 1 to 2 sulfo groups.

9. A process according to claim 8 for trichromatic dyeing, which comprises using a mixture of at least three 1:1 chromium complex azo or azomethine dyes selected from dyes that give yellow or orange, red and blue dyeings, and at least one metal-free dye selected from dyes that give yellow or orange or red or blue dyeings.

10. A process according to claim 8, wherein the 1:1 chromium complex azo or azomethine dyes correspond to formula

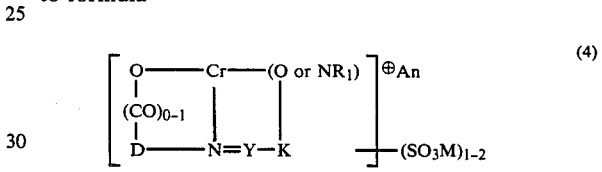

wherein —(CO)$_{\overline{0-1}}$—O and —(O— or —NR$_1$) are linked to D and K adjacent to the azo bridge, D is a radical of the benzene or naphthalene series which is unsubstituted or substituted by halogen C$_1$–C$_4$alkyl, C$_1$–C$_4$alkoxy, nitro or sulfamoyl, K is a phenyl, naphthyl, 1-phenyl-3-methylpyrazol-5-one, acetoacetamide or quinoline radical, each unsubstituted or substituted by halogen, C$_1$–C$_4$alkyl, C$_1$–C$_4$alkoxy, C$_2$–C$_4$alkanoylamino, sulfamoyl or hydroxy, R$_1$ is hydrogen, M is an alkali metal cation, and An is an anion, and Y is a nitrogen atom or the —CH— group.

11. A process according to claim 1, which comprises using mixtures of sulfo-containing 1:1 metal complex dyes and sulfo-containing metal-free dyes in the weight ratio of 40:60 to 95:5.

12. A process according to claim 8, wherein the metal-free sulfo-containing dyes are those of the monoazo, polyazo, anthraquinone, xanthene or triphenylmethane series.

13. A process according to claim 1, wherein the fibre material is synthetic polyamide material, silk or wool.

14. A process according to claim 13, wherein the fibre material is wool.

15. A process according to claim 3 wherein the amount by weight of said fluoride, fluorosilicate, fluoroborate, fluorozirconate or fluorosulfonate is one to three times the amount by weight of dye employed.

16. A process according to claim 15 wherein the amount by weight of said fluoride, fluorosilicate, fluoroborate, fluorozirconate or fluorosulfonate is two to three times the amount by weight of dye employed.

17. A process according to claim 4 wherein said organic acid is formic acid or acetic acid.

18. A process according to claim 4 wherein said another ammonium or alkali metal salt is an alkali metal acetate or alkali metal sulfate.

19. A process according to claim 18 wherein said salt is sodium acetate or sodium sulfate.

20. A process according to claim 5 wherein said pH range is 3.5 to 5.

21. A process according to claim 20 wherein said pH range is 4 to 5.

22. A process according to claim 7 wherein said percent by weight of levelling assistant or levelling assistant mixture is 0.3 to 3 percent.

23. A process according to claim 8 wherein said dye contains 1 or 2 sulfo groups.

24. A process according to claim 1 wherein said 1:1 metal complex dye is a 1:1 chromium complex dye.

25. A composition comprising at least one 1:1 metal complex dye, at least one metal-free sulfo-containing dye and an alkali metal or ammonium fluoride, an alkali metal or ammonium fluorosilicate, an alkali metal or ammonium fluoroborate, an alkali metal or ammonium fluorozirconate or an alkali metal or ammonium fluorosulfonate.

* * * * *